US011111068B1

(12) United States Patent
O'Hara

(10) Patent No.: US 11,111,068 B1
(45) Date of Patent: Sep. 7, 2021

(54) MULTIPLE PURPOSE CONTAINER ASSEMBLY

(71) Applicant: Rosemary O'Hara, Louisville, OH (US)

(72) Inventor: Rosemary O'Hara, Louisville, OH (US)

(73) Assignee: Brookview Development, LLC, Lousiville, OH (US)

( * ) Notice: Subject to any disclaimer, the term of this patent is extended or adjusted under 35 U.S.C. 154(b) by 448 days.

(21) Appl. No.: 15/890,954

(22) Filed: Feb. 7, 2018

Related U.S. Application Data

(60) Provisional application No. 62/455,781, filed on Feb. 7, 2017.

(51) Int. Cl.
*A01K 1/02* (2006.01)
*B65D 81/36* (2006.01)
*B65D 81/38* (2006.01)
*B65D 43/02* (2006.01)
*B65D 43/16* (2006.01)

(52) U.S. Cl.
CPC .......... *B65D 81/365* (2013.01); *A01K 1/0245* (2013.01); *B65D 43/0202* (2013.01); *B65D 43/16* (2013.01); *B65D 81/3813* (2013.01); *B65D 2543/00194* (2013.01)

(58) Field of Classification Search
CPC .. B65D 81/365; B65D 81/3813; B65D 43/16; B65D 43/0202; B65D 2543/00194; A01K 1/0245
USPC ........................................................ 119/482
See application file for complete search history.

(56) References Cited

U.S. PATENT DOCUMENTS

| 6,338,318 B1* | 1/2002 | Apichom ............. A01K 1/0107 |
| | | 119/453 |
| 7,322,314 B1* | 1/2008 | Sweeney ................ A01K 1/032 |
| | | 119/475 |
| 2016/0057968 A1* | 3/2016 | Chandler ............. A01K 1/0272 |
| | | 119/497 |

* cited by examiner

*Primary Examiner* — Claude J Brown
(74) *Attorney, Agent, or Firm* — FisherBroyles, LLP

(57) ABSTRACT

A multiple purpose container assembly may include a lid and a housing having at least one access port. The lid, the housing, or both may include insulating material to help retard heat transfer between the interior of the assembly and the exterior. In one configuration, the assembly provides an insulating sheltering functionality for a small pet, for example. In a second configuration, the access port is blocked and the assembly provides container functionality as an ice chest, cooler, or bulk container for example.

7 Claims, 6 Drawing Sheets

MULTIPLE PURPOSE CONTAINER ASSEMBLY

This application claims the benefit of Provisional Application Ser. No. 62/455,781, filed on Feb. 7, 2017, the entire disclosure of which is incorporated herein by reference.

This disclosure relates generally toward the container arts and more particularly toward multifunction containers adaptable among multiple functionalities.

Containers, pet shelters, coolers and the like, especially those having relatively larger volumes, require significant storage space. As an example, a rectangular pet shelter may require a space measuring 3 feet wide, by 2 feet high, and 2 feet deep. A modest cooler may have similar measurements and a container for just about anything voluminous such as water, feed, recyclables, holiday lights and decorations can easily be of a similar size. In another example, in some climates it may be desirable to provide insulating shelter for a pet, for example, in colder weather while storing the device in the warmer months. Similarly, a user may desire an insulating cooler, for example, in the warmer months and storing the device during cooler months. A multiple purpose container assembly device that remains useful in more than one season significantly reduces or eliminates the requirement for storage of multiple devices.

Systems and methods are disclosed here for providing multi-function assemblies capable of adapting to more than one use. In one embodiment, systems and methods are directed toward a multiple purpose container assembly where individual components may have a first utility and where combinations of components have other utilities different than the first utility. As one particular example, components of a container assembly may function as a pet shelter in one configuration and different components of the container assembly may function as a cooler or ice chest in a second configuration. In another example, select components may function as a storage container for holiday lights, decorations, and the like in one configuration and in a second configuration a side panel access may be provided so that the assembly may function as a pet shelter. Optimally, the different utilities complement each other, for example, the assembly functions as a pet shelter, when the holiday materials are in use and as a container for holiday material in seasons where a pet shelter may not be as useful.

These illustrative features are mentioned not to limit or define the disclosure, but to provide examples to aid in high-level understanding. Additional embodiments and details are discussed in the Detailed Description, and further description is provided there.

BRIEF DESCRIPTION OF THE DRAWINGS

The accompanying drawings, which are incorporated in and constitute a part of the specification, illustrate various example apparatuses, systems, methods, and so on, that illustrate various embodiments of aspects of the invention. It will be appreciated that the illustrated element boundaries (e.g., prisms, boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale and in some instances, cross-hatching is not shown to improve clarity.

DETAILED DESCRIPTION

Figure 1:
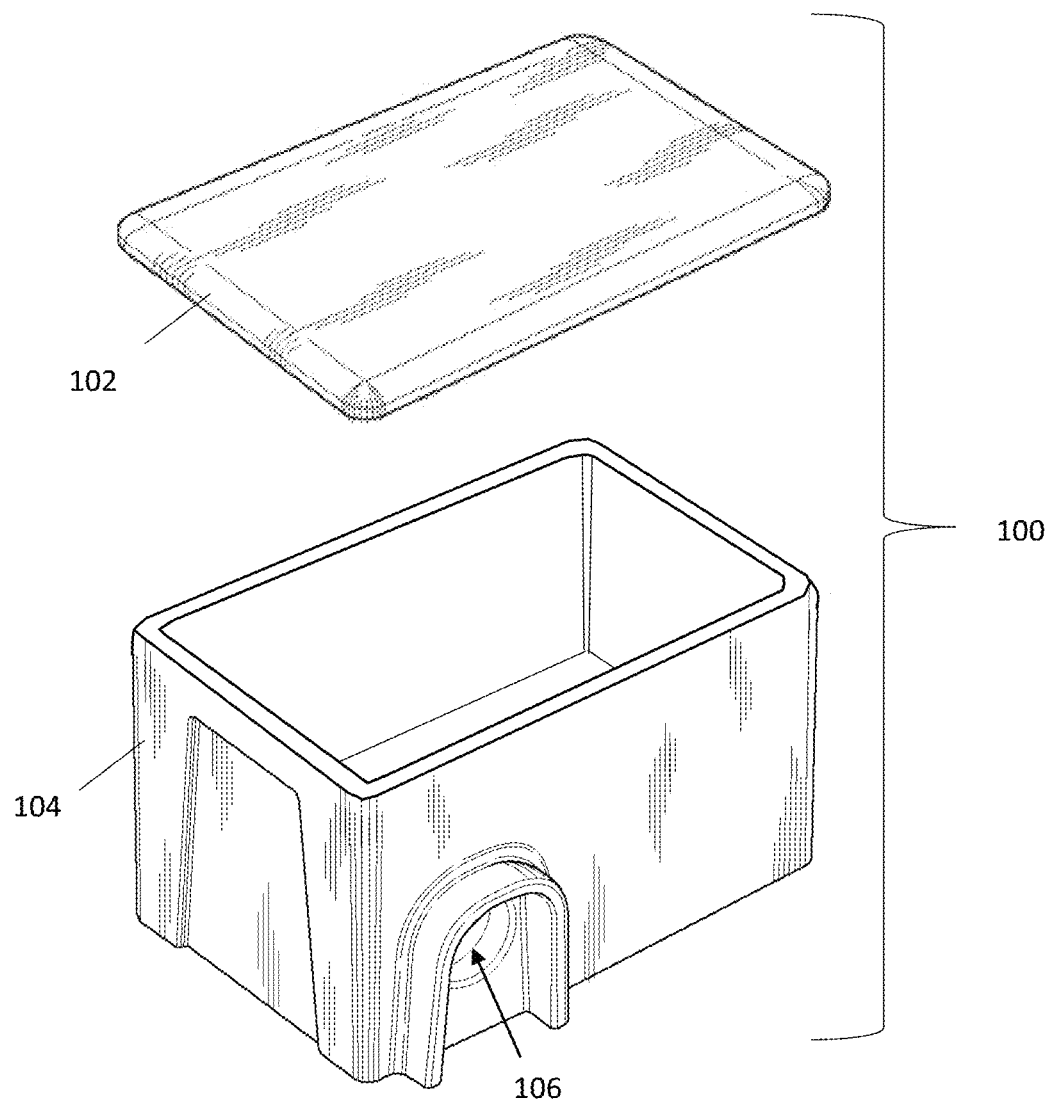
FIG. 1 is an exemplary exploded perspective view of components of a container assembly adapted for a first function.
Figure 2:
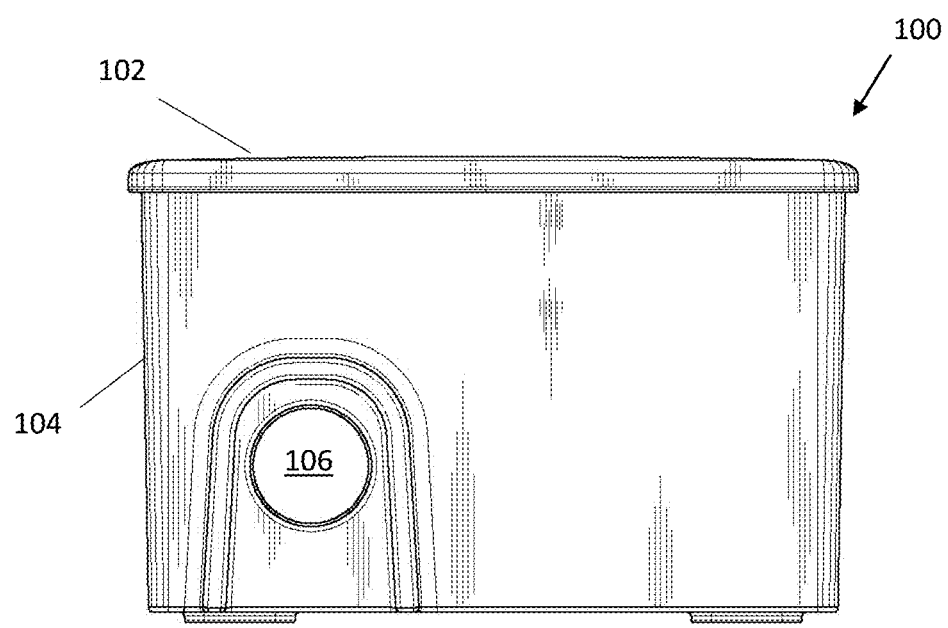
FIG. 2 is a front elevational view of the components of a container assembly of FIG. 1.

With reference to FIGS. 1 and 2, a container assembly 100 is shown. The assembly includes a user removable/replaceable or hinged lid 102 and a housing 104 that can include at least one access port 106. The lid 102, the housing 104, or both may include insulating material such as foam in sufficient thickness to provide desirable R-values, for example R-12. The lid 102 connects to the upper periphery of the housing 104 mechanically, for example by snap-fit indentation/protrusion connections, latches, snaps, machine connections and the like. In other embodiments, not shown, the lid 102 may be hinged to one side of the housing 104 body or the lid may be split or formed from two or more parts with each hinged to the housing. As configured, the assembly 100 may accommodate a pet having ingress to and egress from the shelter through access port 106.

Figure 3:
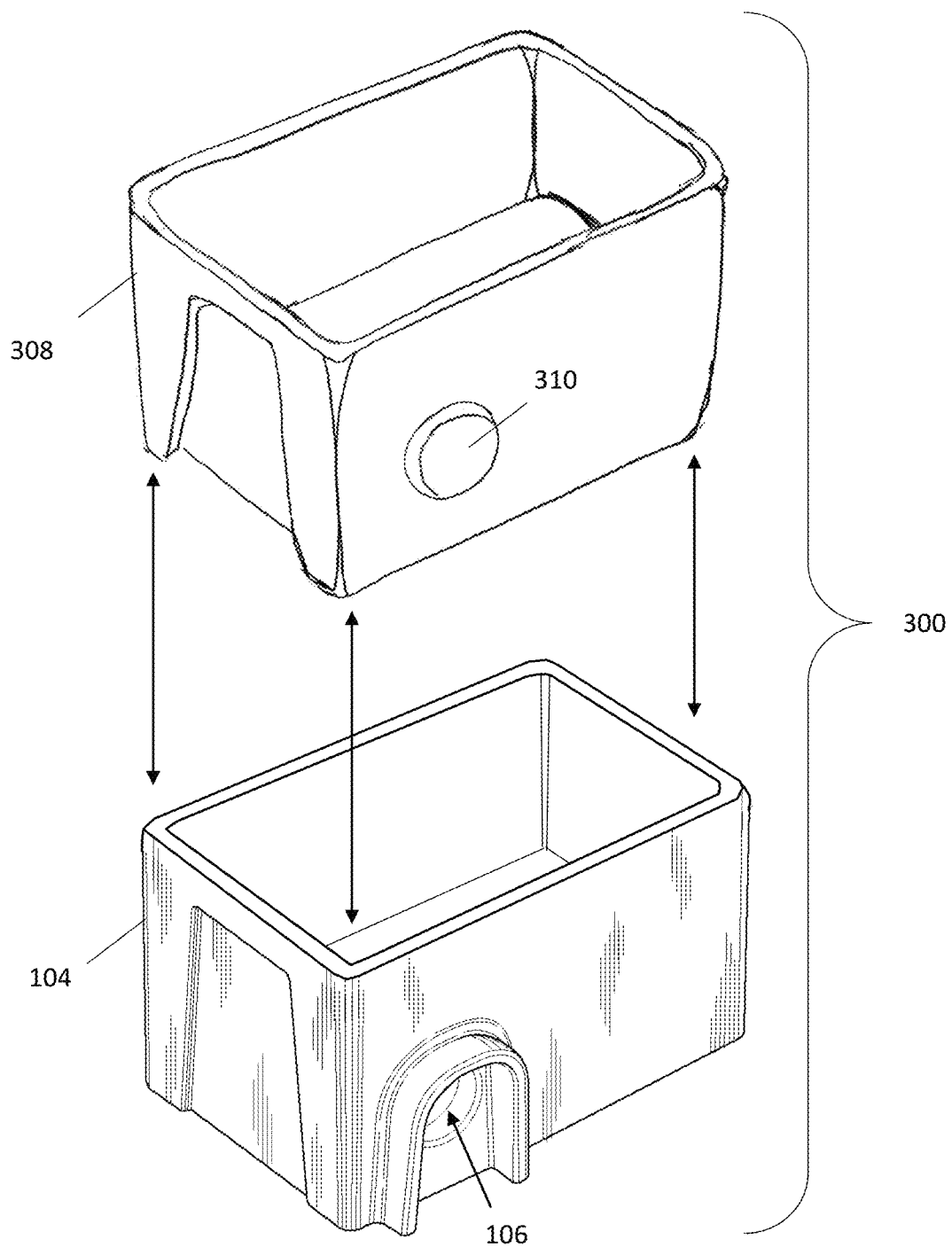
FIG. 3 is an exemplary exploded perspective view of components of a container assembly adapted for a second function.
Figure 4:
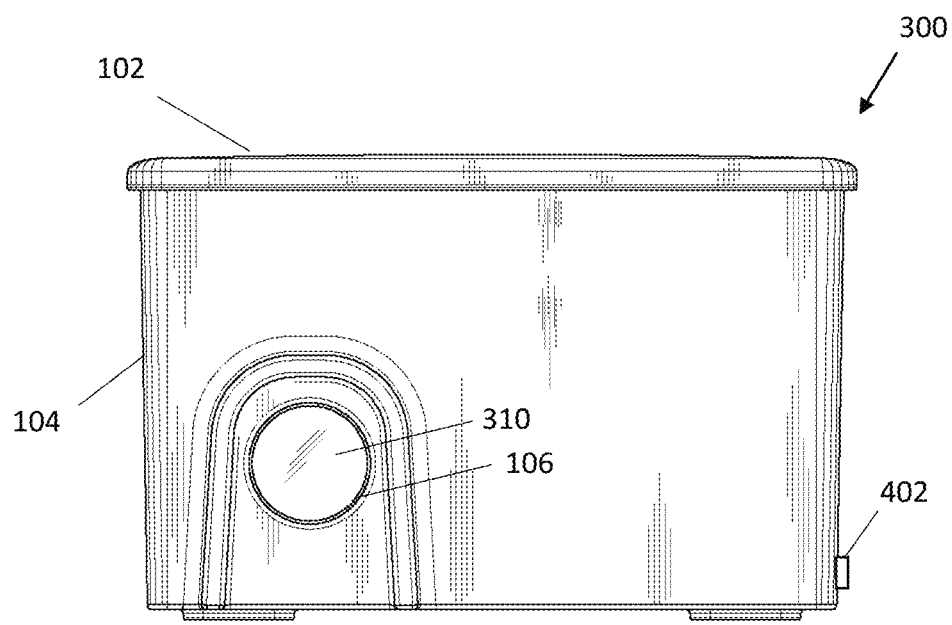
FIG. 4 is a front elevational view of the components of a container assembly of FIG. 3.

With reference to FIGS. 3 and 4, a container assembly 300 is shown. The assembly includes a housing 104 that can include at least one access port 106, a container 308 and a lid 102. The container 308 is shaped to closely fit the inside of the housing 104 and may include a protrusion 310 sized to be received by the access port 106 and assist in maintaining container 308 within the housing 104. The housing 104, the container 308 or both may include insulating properties based on the materials themselves or added insulation.

As can now be appreciated, without container 308, the housing 104 and lid 102 assembly may function as a pet or animal shelter with the pet or animal accessing an interior area within the shelter through access port 106. In this embodiment, when in use as a pet or animal shelter, container 308 is available for other storage uses.

With container 308 in place, the housing 104, container 308 and lid 102 assembly permits compact storage of two bulky apparatus in the space of one. Alternately, the combined assembly may function as a cooler or ice chest, bulk storage container or the like. For example, bulk storage may include storage for household goods, seasonal effects, clothing and the like. Preferably, the stored items are desirable for use when the housing would be desired for use as a pet or animal shelter.

Attention is additionally directed to FIG. 4 and an alternative component 402 of a multifunctional container assembly. Alternative component, cap 402 is shown slightly exaggerated protruding from the side of housing 104. Cap 402 seals an optional additional opening through housing 104 sized to permit a power cord, for example, to the interior of the assembly when in a pet shelter configuration. When in a cooler or ice-chest configuration, cap 402 seals the opening to retain liquids inside the housing when in place and permits liquid to flow or drain from housing when removed.

Figure 5:
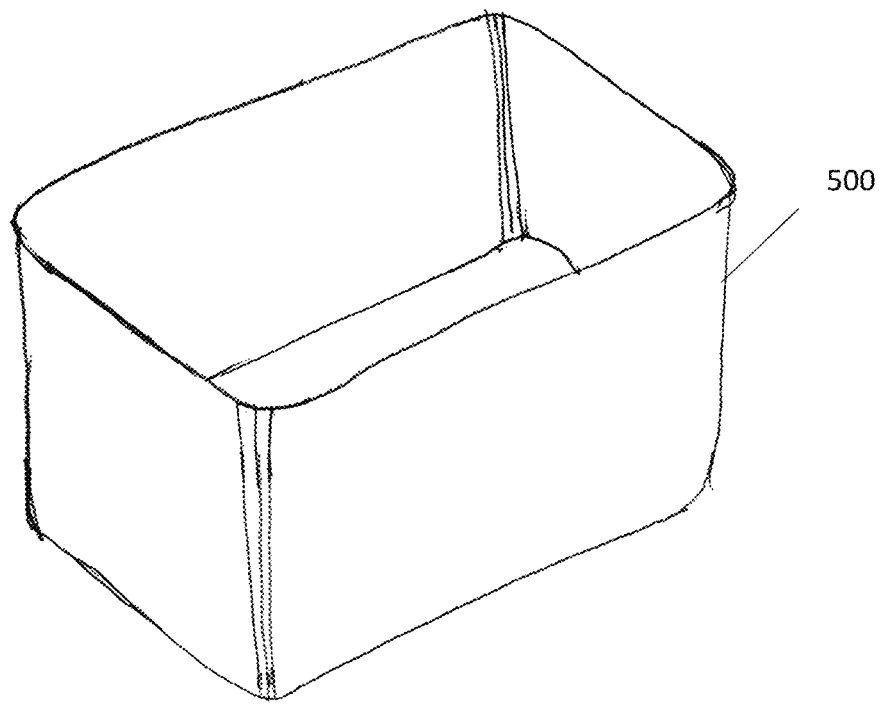
FIG. 5 is a perspective view of an alternate embodiment of a component of a container assembly.

With reference now to FIG. 5, an alternate container 500 is illustrated. In this embodiment, container 500 has no insulating properties other than that possibly provided by the material itself. Additionally, as illustrated, container 500 comprises exterior sides that closely conform to the interior sides of the housing 104 thus covering the access port 106 instead of engaging with it.

Figure 6:
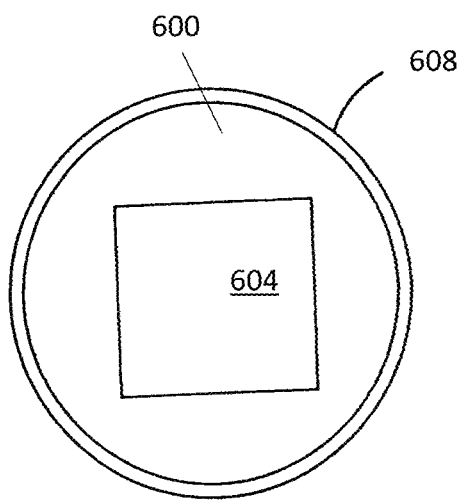
FIG. 6 is a top plan view of an alternate component to change the function of a container assembly.
Figure 7:
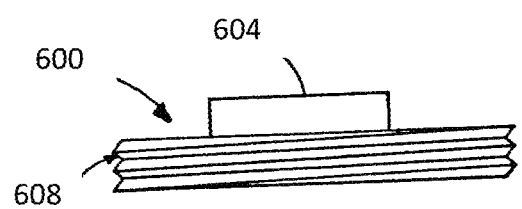
FIG. 7 is a side view of the component of FIG. 6.

With reference to FIGS. 6 and 7, an alternate component, cap 600, enables multifunctional configurations for container assembly 100 (FIG. 1). Specifically, as described above, assembly 100 is functional, for example, as a pet shelter. A user may change the functionality by aligning cap 600 with access port 106 and urging a handle 604 to engage threads 608 with complimentary threads surrounding the periphery of the access port 106. When cap 600 is so engaged, access port 106 is blocked allowing the container assembly to function as a cooler or ice chest or other container. Cap 600 may optionally include or be made from thermally insulating material.

Figure 8:
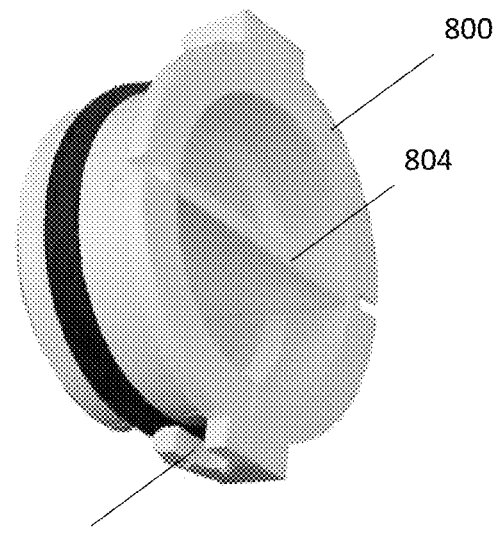
FIG. 8 is a top perspective view of an alternate component to change the function of a container assembly.

With reference to FIG. 8, an alternative cap 800 is manipulated by handle 804 and engages housing 104 with opposing twist locks 806 holding cap 800 over access port 106. Cap 800 may optionally include or be made from thermally insulating material.

Figure 9:
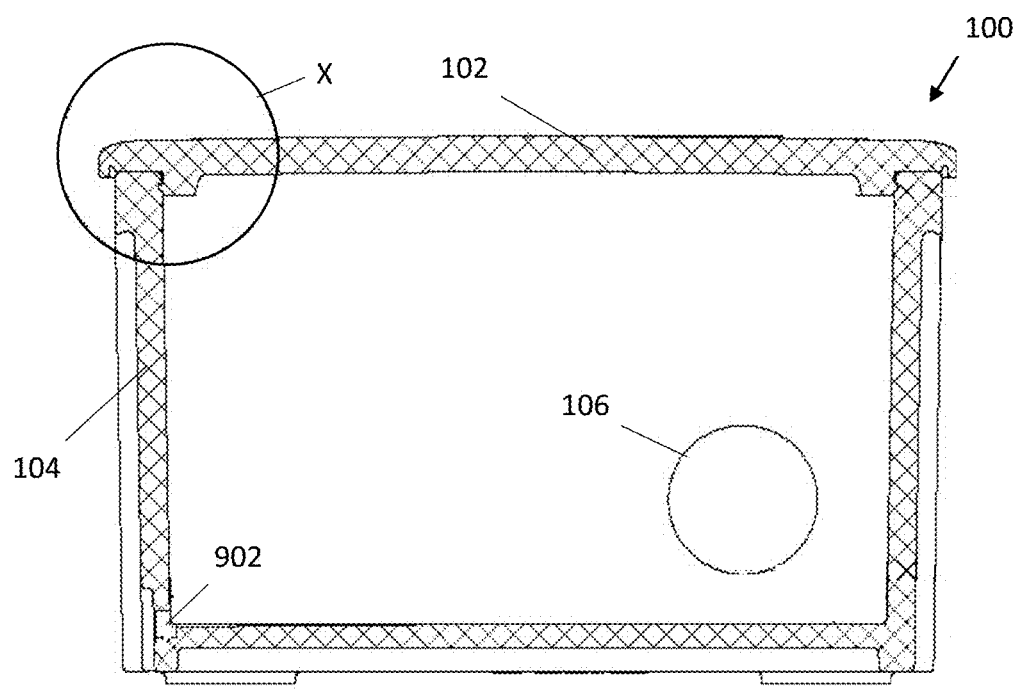
FIG. 9 is a cross-sectional view of the components of the container assembly of FIG. 1.
Figure 10:
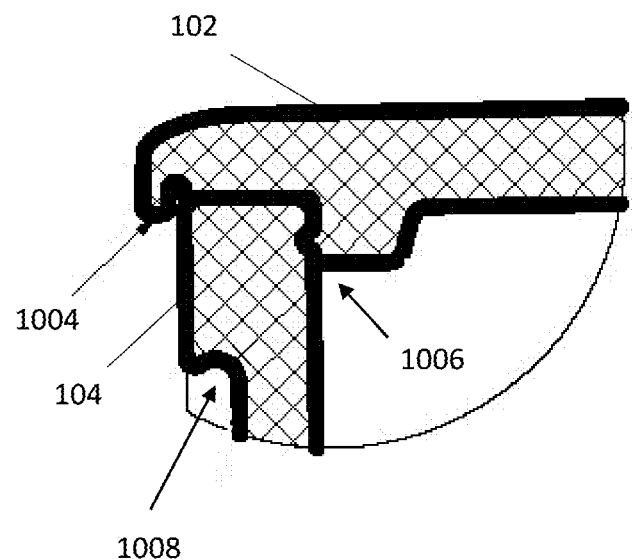
FIG. 10 is an enlarged view of section X of FIG. 9.

With reference now to FIGS. 9 and 10, a cross-sectional view of assembly 100 shows lid 102 and housing 104 engagement. For example, and as best seen in the enlarged view of FIG. 10, lid 102 includes a drip edge 1004 to help prevent water intrusion into the either configuration, shelter or cooler/chest/container. Lid 102 engages with an interior top area of housing 104 via a detent/snap assembly 1006. Molded handles 1008 may be included in opposing sides of housing 104. FIG. 9 additionally illustrates a relatively smaller access port/drain 902. In one configuration, a power cord or water supply may be provided from the exterior of the assembly 100 to the interior when pet shelter functionality is desired. Alternatively, access port/drain 902 may be plugged or capped when ice chest or cooler or bulk container functionality is desired.

In yet another embodiment, a method is provided where an assembly is converted from one utility to a second utility. A housing 104 includes an access 106 through a housing wall into a volume. An access obstruction, 308, 500, is inserted into the volume, or an access obstruction, 600, 800, is connected to the access 106 preventing communication through the access between an exterior side of the housing and the volume. The housing without the access obstruction has a first utility, for example as a pet shelter, and the housing with the access obstruction have a second utility, for example as a container, cooler, ice chest, etc.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Similarly, when the applicants intend to indicate "one and only one" of A, B, or C, the applicants will employ the phrase "one and only one". Thus, use of the term "or" herein is the inclusive, and not the exclusive use. See, Bryan A. Garner, A Dictionary of Modern Legal Usage 624 (2d. Ed. 1995).

What is claimed is:

1. A multiple purpose container assembly comprising:
   a housing including an access through a housing wall into a volume, where the volume is bounded partially by interior surfaces of the housing;
   a lid connected to the housing, where the lid bounds the volume not bounded by the housing; and
   an access obstruction, preventing communication through the access between an exterior side of the housing and the volume;
   where the housing and the lid without the access obstruction have a first utility as a pet shelter, and where the housing and the access obstruction have a second utility as a cooler or ice chest.

2. The multiple purpose container assembly as set forth in claim 1, where the access obstruction comprises a cap obstructing communication through the housing wall via the access.

3. The multiple purpose container assembly as set forth in claim 1, where the access obstruction comprises a container inserted into the volume not bounded by the housing, where the container comprises exterior sides conformed to the interior surfaces of the housing.

4. The multiple purpose container assembly as set forth in claim 3, where the exterior sides of the container include a protrusion to be received by the access where the protrusion obstructs access through the housing wall.

5. A multiple purpose container assembly comprising a plurality of individual components where first select components fewer than all the plurality of components have a first utility as a pet shelter and where second select components including at least some of the first select components have a second utility as a cooler or ice chest.

6. The multiple purpose container assembly as set forth in claim 5, where the first select components comprise a lid and a housing including an access through a housing wall into a volume, where the volume is bounded by interior surfaces of the housing and an interior surface of the lid.

7. The multiple purpose container assembly as set forth in claim 5, where the second select components comprise:
   a housing including an access through a housing wall into a volume, where the volume is bounded at least partially by interior surfaces of the housing; and
   means for obstructing the access and preventing communication through the housing wall via the access.

* * * * *